US009491307B2

(12) United States Patent
Ray et al.

(10) Patent No.: US 9,491,307 B2
(45) Date of Patent: Nov. 8, 2016

(54) SYSTEM AND METHOD FOR ESTABLISHING PRE-STORED EMERGENCY MESSAGES

(75) Inventors: Amar N. Ray, Shawnee, KS (US); John M. Heinz, Olathe, KS (US)

(73) Assignee: CenturyLink Intellectual Property LLC, Denver, CO (US)

( * ) Notice: Subject to any disclaimer, the term of this patent is extended or adjusted under 35 U.S.C. 154(b) by 663 days.

(21) Appl. No.: 12/391,503

(22) Filed: Feb. 24, 2009

(65) Prior Publication Data

US 2010/0215153 A1 Aug. 26, 2010

(51) Int. Cl.
*H04M 11/04* (2006.01)
*H04M 3/51* (2006.01)

(52) U.S. Cl.
CPC .......... *H04M 11/04* (2013.01); *H04M 3/5116* (2013.01); *H04M 2242/04* (2013.01)

(58) Field of Classification Search
CPC  G08B 25/012; G08B 25/014; G08B 25/016; H04M 11/045; H04W 76/007
USPC .............. 379/37, 41, 45, 51; 455/404.1, 521
See application file for complete search history.

(56) References Cited

U.S. PATENT DOCUMENTS

| | | |
|---|---|---|
| 5,339,351 A | 8/1994 | Hoskinson et al. |
| 5,379,337 A | 1/1995 | Castillo et al. |
| 5,497,149 A | 3/1996 | Fast |
| 5,555,286 A | 9/1996 | Tendler |
| 5,646,987 A | 7/1997 | Gerber et al. |
| 5,937,038 A | 8/1999 | Bell et al. |
| 6,137,877 A | 10/2000 | Robin et al. |
| 6,240,285 B1 | 5/2001 | Blum et al. |
| 6,317,049 B1 | 11/2001 | Toubia et al. |
| 6,366,772 B1 | 4/2002 | Arnson |
| 6,415,018 B1 | 7/2002 | Antonucci et al. |
| 6,480,578 B1 | 11/2002 | Allport |
| 6,526,125 B1 | 2/2003 | Lindsay et al. |
| 6,591,112 B1 | 7/2003 | Siccardo et al. |
| 6,642,844 B2 | 11/2003 | Montague |
| 6,678,357 B2 | 1/2004 | Stumer et al. |
| 6,690,932 B1 | 2/2004 | Barnier et al. |
| 6,771,163 B2 * | 8/2004 | Linnett et al. ............. 340/309.5 |
| 6,839,022 B1 | 1/2005 | Benco et al. |
| 7,026,925 B2 | 4/2006 | Roche et al. |
| 7,079,627 B2 | 7/2006 | Crago et al. |
| 7,095,733 B1 | 8/2006 | Yarlagadda et al. |
| 7,098,787 B2 | 8/2006 | Miller |
| 7,231,218 B2 | 6/2007 | Diacakis et al. |
| 7,269,413 B2 | 9/2007 | Kraft |

(Continued)

OTHER PUBLICATIONS

Federal Standard 1037C: Telecommunications: Glossary of Telecommunication Terms. National Communication System. Technology and Standards Division. Washington, DC: General Services Administration, Information Technology Service, 1996. pp. vii, A-28, H-7, & O-2.*

(Continued)

*Primary Examiner* — Duc Nguyen
*Assistant Examiner* — Kile Blair
(74) *Attorney, Agent, or Firm* — Swanson & Bratschun, L.L.C.

(57) ABSTRACT

A system and method for assisting with calls to public safety answering points may include receiving emergency message data from a user, and, in response to receiving an emergency call request from the user at a telecommunications device, communicating the emergency message data in an audio format to a PSAP.

17 Claims, 12 Drawing Sheets

(56) References Cited

U.S. PATENT DOCUMENTS

| | | | |
|---|---|---|---|
| 7,342,917 B2 | 3/2008 | Mohan et al. | |
| 7,386,103 B1 | 6/2008 | Chahal | |
| 7,418,087 B2 | 8/2008 | Luneau et al. | |
| 7,496,189 B2 | 2/2009 | Clarisse et al. | |
| 7,574,194 B2 | 8/2009 | Yang et al. | |
| 7,679,505 B1 | 3/2010 | Vallaire | |
| 7,706,356 B1 | 4/2010 | Olshansky et al. | |
| 7,734,019 B1 | 6/2010 | Terpstra | |
| 7,773,975 B2 | 8/2010 | Snapp et al. | |
| 7,843,903 B2* | 11/2010 | Bakke et al. | 370/354 |
| 7,920,679 B1 | 4/2011 | Naim et al. | |
| 7,991,135 B2 | 8/2011 | Rauba et al. | |
| 8,014,341 B1 | 9/2011 | Ray | |
| 8,102,986 B1 | 1/2012 | McClintock et al. | |
| 8,295,801 B2 | 10/2012 | Ray et al. | |
| 8,320,871 B2 | 11/2012 | Ray et al. | |
| 8,364,113 B2 | 1/2013 | Ray et al. | |
| 8,447,267 B2 | 5/2013 | Ray et al. | |
| 8,615,214 B2* | 12/2013 | Jain et al. | 455/404.1 |
| 8,630,609 B2 | 1/2014 | Ray et al. | |
| 8,712,366 B2 | 4/2014 | Greene et al. | |
| 8,718,595 B2 | 5/2014 | Ray et al. | |
| 8,891,749 B2 | 11/2014 | Geldbach et al. | |
| 8,923,803 B2 | 12/2014 | Ray et al. | |
| 8,964,945 B2 | 2/2015 | Ray | |
| 8,976,938 B2 | 3/2015 | Zerillo et al. | |
| 8,982,871 B2 | 3/2015 | Ray et al. | |
| 9,025,734 B2 | 5/2015 | Ray et al. | |
| 9,031,207 B2 | 5/2015 | Ray et al. | |
| 9,131,361 B2 | 9/2015 | Ray | |
| 9,179,280 B2 | 11/2015 | Ray et al. | |
| 9,357,370 B2 | 5/2016 | Ray | |
| 2001/0003843 A1 | 6/2001 | Scepanovic et al. | |
| 2001/0004588 A1 | 6/2001 | Hong | |
| 2001/0012379 A1 | 8/2001 | Amemiya et al. | |
| 2002/0012323 A1 | 1/2002 | Petite et al. | |
| 2002/0016189 A1 | 2/2002 | Sheynblat et al. | |
| 2002/0054667 A1 | 5/2002 | Martinez | |
| 2002/0136363 A1 | 9/2002 | Stumer et al. | |
| 2003/0012344 A1* | 1/2003 | Agarwal et al. | 379/37 |
| 2003/0063714 A1 | 4/2003 | Stumer et al. | |
| 2003/0109245 A1 | 6/2003 | McCalmont et al. | |
| 2003/0133450 A1 | 7/2003 | Baum | |
| 2003/0158668 A1 | 8/2003 | Anderson | |
| 2004/0072583 A1 | 4/2004 | Weng | |
| 2004/0077347 A1 | 4/2004 | Lauber et al. | |
| 2004/0090950 A1 | 5/2004 | Lauber et al. | |
| 2004/0176123 A1 | 9/2004 | Chin et al. | |
| 2004/0257273 A1 | 12/2004 | Benco et al. | |
| 2005/0002499 A1 | 1/2005 | Ordille et al. | |
| 2005/0003797 A1 | 1/2005 | Baldwin | |
| 2005/0070315 A1 | 3/2005 | Rai et al. | |
| 2005/0101287 A1 | 5/2005 | Jin et al. | |
| 2005/0111630 A1 | 5/2005 | Potorny et al. | |
| 2005/0123102 A1 | 6/2005 | Beason et al. | |
| 2005/0151642 A1 | 7/2005 | Tupler et al. | |
| 2005/0159132 A1 | 7/2005 | Wright et al. | |
| 2005/0169248 A1 | 8/2005 | Truesdale et al. | |
| 2005/0197096 A1 | 9/2005 | Yang et al. | |
| 2005/0201358 A1 | 9/2005 | Nelson et al. | |
| 2005/0209781 A1 | 9/2005 | Anderson | |
| 2005/0232225 A1 | 10/2005 | Pelaez et al. | |
| 2005/0265326 A1 | 12/2005 | Laliberte | |
| 2006/0009190 A1 | 1/2006 | Laliberte | |
| 2006/0043164 A1 | 3/2006 | Dowling et al. | |
| 2006/0052134 A1 | 3/2006 | Sato | |
| 2006/0072547 A1 | 4/2006 | Florkey et al. | |
| 2006/0133582 A1 | 6/2006 | McCulloch | |
| 2006/0217136 A1 | 9/2006 | Bantukul et al. | |
| 2006/0219542 A1 | 10/2006 | Savir | |
| 2006/0234727 A1 | 10/2006 | Ashley et al. | |
| 2006/0293024 A1 | 12/2006 | Benco et al. | |
| 2007/0003024 A1 | 1/2007 | Olivier et al. | |
| 2007/0041368 A1 | 2/2007 | Lorello et al. | |
| 2007/0064882 A1 | 3/2007 | Ger et al. | |
| 2007/0121851 A1 | 5/2007 | Maropis et al. | |
| 2007/0201391 A1 | 8/2007 | Belmonte et al. | |
| 2007/0273519 A1 | 11/2007 | Ichikawa et al. | |
| 2007/0280428 A1 | 12/2007 | McClelland | |
| 2007/0287473 A1 | 12/2007 | Dupray | |
| 2008/0018452 A1 | 1/2008 | McCarthy et al. | |
| 2008/0026728 A1 | 1/2008 | Snapp et al. | |
| 2008/0057944 A1 | 3/2008 | Miriyala et al. | |
| 2008/0064363 A1 | 3/2008 | Salafia et al. | |
| 2008/0064375 A1 | 3/2008 | Gottlieb | |
| 2008/0070546 A1 | 3/2008 | Lee | |
| 2008/0144779 A1 | 6/2008 | Ray et al. | |
| 2008/0200143 A1 | 8/2008 | Qiu et al. | |
| 2008/0261557 A1 | 10/2008 | Sim | |
| 2008/0273670 A1 | 11/2008 | Dickinson | |
| 2008/0304630 A1 | 12/2008 | Nguyen et al. | |
| 2009/0047924 A1 | 2/2009 | Ray et al. | |
| 2009/0086932 A1 | 4/2009 | Ray | |
| 2009/0097474 A1 | 4/2009 | Ray et al. | |
| 2009/0144260 A1 | 6/2009 | Bennett et al. | |
| 2009/0186596 A1 | 7/2009 | Kaltsukis | |
| 2009/0197567 A1 | 8/2009 | Ogram | |
| 2009/0214011 A1 | 8/2009 | Geldbach et al. | |
| 2009/0227225 A1 | 9/2009 | Mitchell et al. | |
| 2009/0305730 A1 | 12/2009 | Herz et al. | |
| 2009/0310602 A1 | 12/2009 | Olshansky et al. | |
| 2010/0002845 A1 | 1/2010 | Zerillo et al. | |
| 2010/0002846 A1 | 1/2010 | Ray et al. | |
| 2010/0003946 A1 | 1/2010 | Ray et al. | |
| 2010/0003947 A1 | 1/2010 | Ray et al. | |
| 2010/0003949 A1 | 1/2010 | Ray et al. | |
| 2010/0003954 A1 | 1/2010 | Ray et al. | |
| 2010/0003955 A1 | 1/2010 | Ray et al. | |
| 2010/0003961 A1 | 1/2010 | Ray et al. | |
| 2010/0098062 A1 | 4/2010 | Croak et al. | |
| 2010/0107192 A1 | 4/2010 | Sennett et al. | |
| 2010/0142386 A1 | 6/2010 | Snapp et al. | |
| 2010/0215153 A1 | 8/2010 | Ray et al. | |
| 2010/0291894 A1 | 11/2010 | Pipes | |
| 2011/0014923 A1 | 1/2011 | Krco et al. | |
| 2011/0096769 A1 | 4/2011 | Sim | |
| 2012/0214437 A1 | 8/2012 | Ray et al. | |
| 2012/0309340 A1 | 12/2012 | Ray | |
| 2013/0012156 A1 | 1/2013 | Ray et al. | |
| 2013/0059560 A1 | 3/2013 | Ray et al. | |
| 2013/0102269 A1 | 4/2013 | Ray et al. | |
| 2013/0217355 A1 | 8/2013 | Ray et al. | |
| 2013/0237181 A1 | 9/2013 | Ray | |
| 2015/0350864 A1 | 12/2015 | Ray | |

OTHER PUBLICATIONS

U.S. Appl. No. 12/257,862; Non-Final Rejection dated Mar. 13, 2013; 30 pages.

U.S. Appl. No. 13/715,808; Non-Final Rejection dated Apr. 9, 2013; 36 pages.

U.S. Appl. No. 11/904,883; Non Final Rejection dated Apr. 19, 2013; 22 pages.

U.S. Appl. No. 13/460,507; Non-Final Rejection dated Apr. 26, 2013; 19 pages.

U.S. Appl. No. 13/614,585; Issue Notification dated May 1, 2013; 1 page.

U.S. Appl. No. 12/257,424; Non-Final Rejection dated Jul. 8, 2013; 46 pages.

U.S. Appl. No. 13/847,388; Non-Final Office Action dated Jul. 17, 2013; 54 pages.

U.S. Appl. No. 12/257,862; Non-Final Rejection dated 8/23/13; 29 pages.

U.S. Appl. No. 13/715,808; Notice of Allowance dated Sep. 13, 2013; 27 pages.

U.S. Appl. No. 12/257,424; Final Rejection dated Nov. 21, 2013; 34 pages.

U.S. Appl. No. 12/257,624; Non-Final Rejection dated Oct. 16, 2013; 38 pages.

U.S. Appl. No. 12/257,862; Notice of Allowance dated Dec. 6, 2013; 21 pages.

(56) References Cited

OTHER PUBLICATIONS

U.S. Appl. No. 12/257,928; Non-Final Rejection dated Nov. 20, 2013; 35 pages.
U.S. Appl. No. 13/460,507; Notice of Allowance dated Dec. 20, 2013; 20 pages.
U.S. Appl. No. 13/715,808; Issue Notification dated Dec. 24, 2013; 1 page.
U.S. Appl. No. 13/847,388; Non-Final Office Action dated Dec. 9, 2013; 34 pages.
U.S. Appl. No. 11/640,714; Notice of Allowance dated Dec. 12, 2014; 41 pages.
U.S. Appl. No. 11/904,883; Notice of Allowance dated Oct. 8, 2014; 17 pages.
U.S. Appl. No. 12/070,909; Issue Notification dated Oct. 29, 2014; 1 page.
U.S. Appl. No. 12/168,668; Notice of Allowance dated Oct. 7, 2014; 31 pages.
U.S. Appl. No. 12/257,424; Issue Notification dated Dec. 10, 2014; 1 page.
U.S. Appl. No. 13/612,558; Notice of Allowance dated Sep. 16, 2014; 16 pages.
U.S. Appl. No. 13/847,388; Final Rejection dated Dec. 4, 2014; 39 pages.
U.S. Appl. No. 11/640,714; Non-Final Rejection dated May 29, 2014; 50 pages.
U.S. Appl. No. 11/904,883; Non Final Rejection dated Jun. 10, 2014; 15 pages.
U.S. Appl. No. 12/070,909; Notice of Allowance dated Jul. 23, 2014; 33 pages.
U.S. Appl. No. 12/257,424; Notice of Allowance dated Aug. 11, 2014; 36 pages.
U.S. Appl. No. 12/257,624; Final Office Action dated May 13, 2014; 28 pages.
U.S. Appl. No. 12/257,928; Issue Notification dated Jun. 25, 2014; 1 page.
U.S. Appl. No. 13/847,388; Non-Final Rejection dated Jul. 17, 2014; 39 pages.
U.S. Appl. No. 13/848,649; Non-Final Rejection dated Jul. 17, 2014; 21 pages.
U.S. Appl. No. 13/848,649; Non-Final Rejection dated Dec. 29, 2014; 12 pages.
U.S. Appl. No. 12/257,624; Notice of Allowance dated Jan. 5, 2015; 18 pages.
U.S. Appl. No. 11/904,883; Issue Notification dated Feb. 4, 2015; 1 page.
U.S. Appl. No. 12/168,668; Issue Notification dated Feb. 18, 2015; 1 page.
U.S. Appl. No. 13/612,558; Issue Notification dated Feb. 25, 2015, 1 page.
U.S. Appl. No. 13/847,388; Notice of Allowance dated Mar. 20, 2015; 33 pages.
U.S. Appl. No. 13/847,388; Issue Notification dated Oct. 14, 2015; 1 page.
U.S. Appl. No. 13/848,649; Issue Notification dated Aug. 19, 2015; 1 page.
U.S. Appl. No. 14/825,611; Non-Final Office Action dated Oct. 13, 2015; 14 pages.
U.S. Appl. No. 12/257,624; Issue Notification dated Apr. 15, 2015; 1 page.
U.S. Appl. No. 11/640,714; Issue Notification dated Apr. 22, 2015; 1 page.
U.S. Appl. No. 13/848,649; Notice of Allowance dated May 4, 2015; 15 pages.
U.S. Appl. No. 13/847,388; Notice of Allowance dated Jun. 23, 2015; 29 pages.
U.S. Appl. No. 14/825,611; Notice of Allowance dated Feb. 4, 2016; 27 pages.
U.S. Appl. No. 14/825,611; Issued Notification dated May 11, 2016; 1 page.

\* cited by examiner

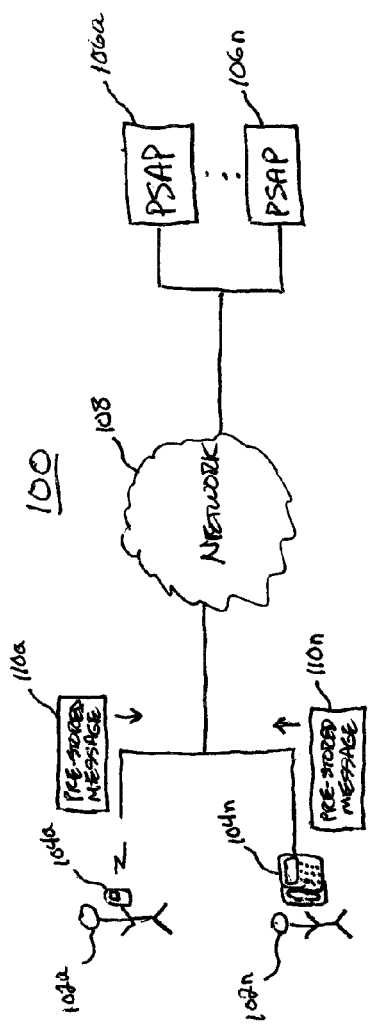
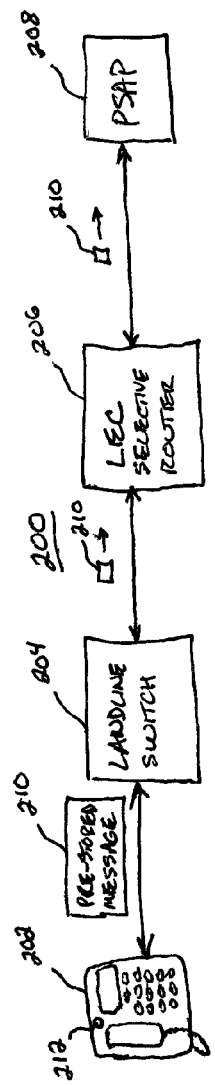
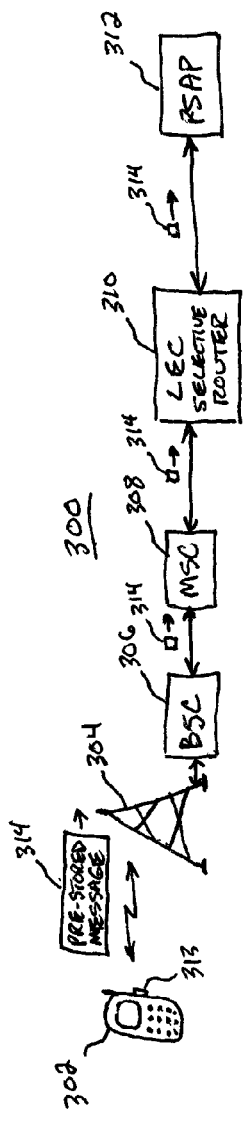

SYSTEM AND METHOD FOR ESTABLISHING PRE-STORED EMERGENCY MESSAGES

BACKGROUND

Emergency 911 calls placed to public safety answering points (PSAPs) provide emergency operators with certain information, including callback telephone number and physical location information. If an emergency 911 call is placed using a wireline telephone, master street address guide (MSAG) information is generated by an automated location identifier (ALI) local to or remotely located from a PSAP. If an emergency 911 call is placed using a wireless device, then the PSAP may receive global positioning system information and convert the information into a street address. Even with the location information, emergency 911 operators generally rely on a caller being able to speak and provide additional information specific to the emergency situation and caller. For example, a caller can provide the operator with the type of emergency (e.g., fire, medical condition, vehicular accident) and names of related people (e.g., spouse, relatives, friends, co-workers). However, in many instances, it is not always possible or desirable for a caller to speak with an emergency operator during an emergency. For example, a caller who is deaf cannot easily speak with an emergency operator. Furthermore, young children, those who are in an automobile accident or fire may also not be able to speak with an emergency operator. In addition, a person hiding from or running from an attacker may also be unable to speak with a PSAP operator. In sum, what is needed is a way for providing information to a PSAP operating in the event that the caller is unable to or does not desire to speak with a PSAP operator.

SUMMARY

To overcome the problem of an emergency 911 caller not being able to speak with an emergency operator, the principles of the present invention provide for a pre-stored emergency message to be created and made available to a caller to use in communicating to a PSAP operator during an emergency 911 call. A system located on a network may enable a user to create a pre-stored emergency message with information that may be downloaded to a telephone and thereafter be communicated to a PSAP for playing to an emergency operator. In one embodiment, the pre-stored emergency message may be generated through a graphical user interface, such as a website, and downloaded to a user's telephone. Alternatively, the pre-stored emergency message may be maintained on a network node, such as a server on the Internet or telecommunications network, and be sent to a PSAP in response to an emergency 911 call being placed by the user.

One embodiment of a system for assisting with calls to public safety answering points may include a network node configured to enable a user to submit emergency message data and a telecommunications device. The telecommunications device may include a memory, transceiver configured to communicate over a telecommunications network, and a processing unit in communication with the memory and transceiver. The processing unit may be configured to, in response to receiving the emergency message data in an audio format via the telecommunications network, store the audio emergency message in the memory, and communicate the audio emergency message to a public safety answering point in response to the user requesting the audio emergency message being communicated to the public safety answering point.

One embodiment of a method for assisting with calls to public safety answering points may include receiving emergency message data from a user, and, in response to receiving an emergency call request from the user at a telecommunications device, communicating the emergency message data in an audio format to a PSAP.

Another embodiment of a method for assisting with calls to public safety answering points may include providing a user interface to a user of a telecommunications device to enable the user to selectably enter emergency information. The emergency information entered by the user may be stored, and, in response to the user calling a public safety answering point via the telecommunications device, the emergency information may be communicated in an audio format to the public safety answering point.

BRIEF DESCRIPTION

Illustrative embodiments of the present invention are described in detail below with reference to the attached drawing figures, which are incorporated by reference herein and wherein:

FIG. 1 is an illustration of an illustrative network environment in which a user may communicate a pre-stored emergency message to a public safety answering point;

FIG. 2 is an illustration of an illustrative network environment in which a landline telephone may be used to communicate a pre-stored emergency message to a PSAP;

FIG. 3 is an illustration of an illustrative wireless network environment in which a user of a wireless telephone may communicate a pre-stored emergency message to a PSAP;

FIG. 8 is an illustration of an illustrative graphical user interface configured to enable a user to submit or otherwise create a pre-stored emergency message for communicating to a PSAP during an emergency;

Figure 13:
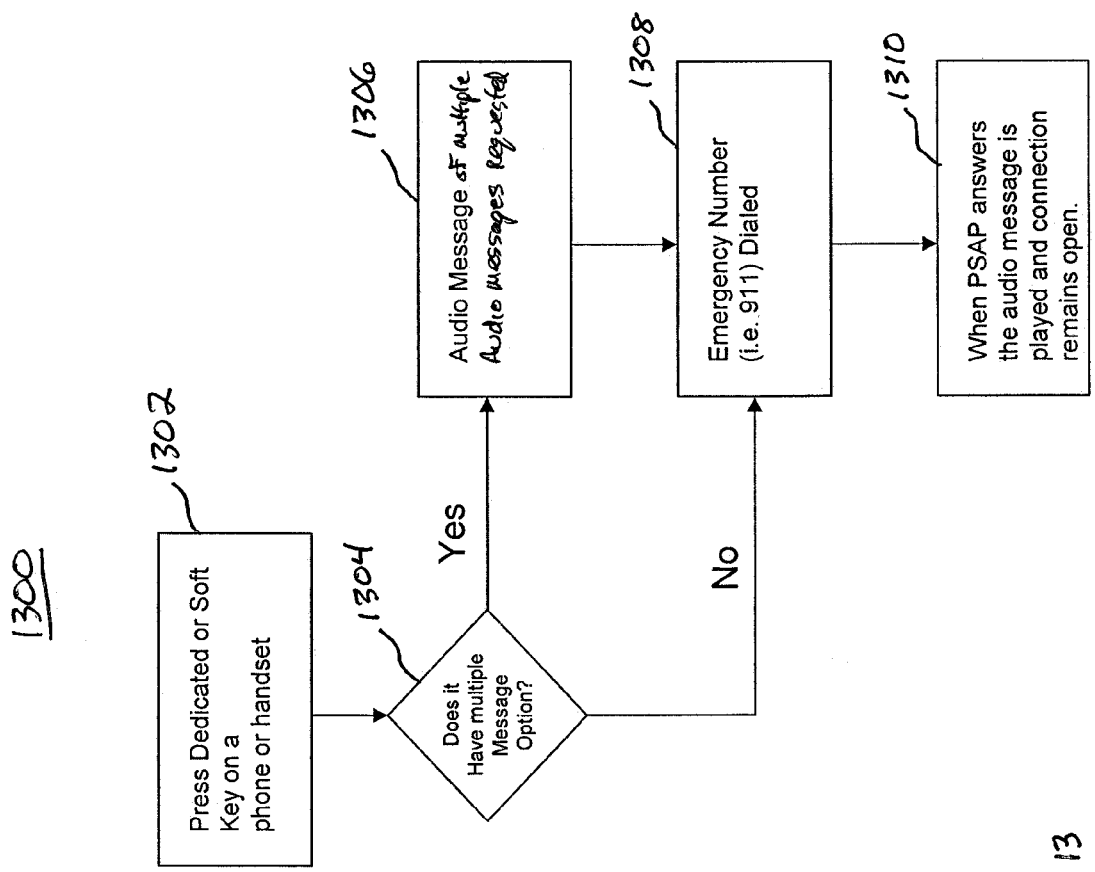
Figure 14:
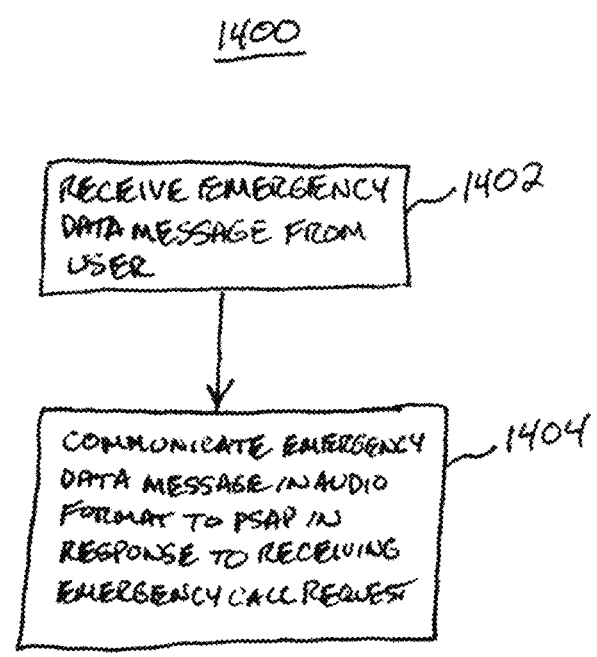

FIG. 13 is a flow diagram of an illustrative process for a user to access one of multiple pre-stored emergency messages stored in a telephone or on a network for communication to an emergency operator at a PSAP during an emergency telephone call; and FIG. 14 is a flow diagram of an illustrative process for creating and communicating an emergency message in an audio format in accordance with the principles of the present invention.

DETAILED DESCRIPTION

With regard to FIG. 1, an illustrative network environment 100 shows users 102a-102n (collectively 102) using telephones 104a-104n (collectively 104). The telephone 104a is shown to be a mobile telephone, which may be a cell phone, Wi-Fi phone, or any other mobile telephone, as understood in the art. The telephone 104n may be an office telephone, home telephone, cordless telephone, or any other telephone that operates in the same or similar manner as a wireline telephone. In the event of an emergency, users 102 may call an emergency 911 operator at one of multiple PSAPs 106a-106n (collectively 106).

As understood in the art, there are upwards of 7,000 PSAPs within the United States. To accommodate routing an emergency 911 telephone call from a user of either wireline or wireless telephones, infrastructure within a network 108 is available. The network 108 may be a public switched telephone network (PSTN), wireless telephone network, Internet, or a combination thereof. The telephones 104, in accordance with the principles of the present invention, may store emergency messages 110a-110n (collectively 110), respectively, for use by the users 102 to communicate via the network 108 to one of the PSAPs 106. The pre-stored messages 110 may be audio messages stored on the telephones 104 or data messages that are routed to a network node (not shown) on the network 108 for conversion to a speech synthesized message to be communicated to an operator at one of the PSAPs 106 during an emergency 911 telephone call by the users 102.

With regard to FIG. 2, a network environment 200 for a wireline telephone 202 is provided. The network environment 200 may include a landline switch 204, such as a Class 5 switch, local exchange carrier (LEC) selective router (SR) 206, which may be configured to select one of the thousands of PSAPs in the country to which the telephone 202 is to be connected based on location of the telephone 202 and PSAP 208. In the event of an emergency, a user of the telephone 202 may request a pre-stored emergency message 210 to be communicated to the PSAP 208 by selecting a hard-button 212. Although shown as a hard-button 212, it should be understood that the telephone 202 may be equipped with any other mechanism for a user to selectably initiate communication of the pre-stored emergency message 210 to the PSAP 208. In one embodiment, rather than having a single, hard-button, multiple hard-buttons may be located on the telephone 202 for a user to press simultaneously to minimize accidental selection of the hard-button 212 to inadvertently communicate the pre-stored emergency message 210. Alternatively, the telephone 202 may be configured to require a user to depress the hard-button 212 for a minimum time period, such as two seconds, or depress the hard-button 212 in a specific pattern, such as three times within a second. In an alternative embodiment, the telephone 202 may be configured with a preference option that, in response to a user dialing 911 or other emergency code, the telephone 202 may communicate the pre-stored emergency message 210 to the PSAP 208. It should be understood that a variety of different mechanisms or processes may be employed on the telephone 202 to enable a user to quickly call a PSAP during an emergency situation and communicate the pre-stored emergency message 210 to the PSAP 208. In one embodiment, after the pre-stored emergency message 210 is communicated to the PSAP 208, the telephone 202 may be configured to remain off-hook for a certain period of time (e.g., one minute) to enable a user to provide an operator at the PSAP with additional information beyond that in the pre-stored emergency message 210.

With regard to FIG. 3, an illustrative network environment 300 for a wireless telephone 302 is shown. The network environment 300 may include a tower 304 to which the mobile telephone 302 communicates to access the network environment 300. The tower 304 may include or be in communication with a base station controller 306, which, in turn, is in communication with a mobile switching center 308. The mobile switching center 308 may be in communication with a local exchange carrier selective router 310, which may be positioned on the PSTN, as understood in the art. The mobile telephone 302 may include a hard-button 313 that may be utilized by a user to initiate a call to the PSTN and, in response to the user selecting the hard-button 313, a pre-stored emergency message 314 may be communicated from the mobile telephone 302 to the PSAP 312. The pre-stored emergency message 314 may be in an audio format or data format. If in an audio format, the pre-stored emergency message 314 may be converted by a text-to-speech system located in the network environment 300.

Figure 4A:
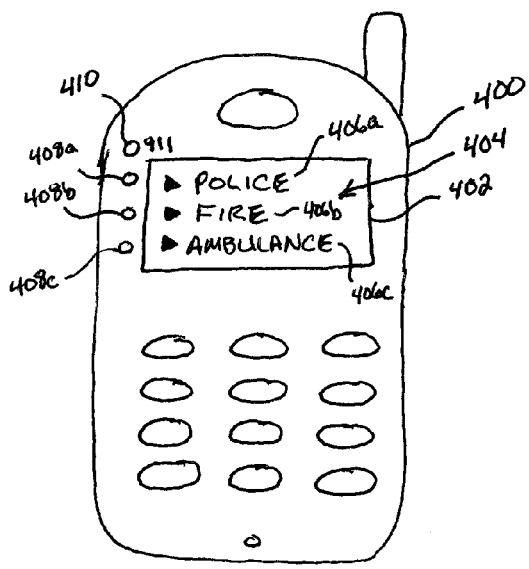
FIG. 4A is an illustration of an illustrative cordless handset configured to store pre-stored emergency messages for selection and communication to a PSAP during an emergency.

With regard to FIG. 4A, an illustrative cordless handset 400 of a wireline telephone (not shown) is provided. The cordless handset 400 may utilize cordless communications protocols, as understood in the art. The cordless handset 400 may include an electronic display 402 on which a user interface 404, which may be a graphical user interface or a text user interface, may be displayed. The user interface 404 may present one or more selectable options 406a-406c (collectively 406) that a user may select. In one embodiment, the user may select the selectable options 406 using hard-buttons 408a-408c (collectively 408) that may be respectively associated with each of the selectable options 406. In the event of an emergency, the user may select one of the hard-buttons 408 to initiate an emergency call to police, fire, or ambulance emergency services. In one embodiment, another hard-button 410 may be selected by a user to dial 911 and communicate a generic pre-stored emergency message in an audio format.

The cordless handset 400 may be configured to store one or more emergency messages that may be communicated to a PSAP in response to a user selecting one of the hard-buttons 408 or 410. If multiple pre-stored emergency messages are stored by the cordless handset 400, then each of the emergency messages may be associated with the different options 406 or a generic call to 911. For example, an emergency message associated with police may include information that may provide clues for police in the event that the user has particular concerns about others or environmental conditions that police may be able to use in the event that the user is unable to be located or unable to communicate upon police arrival. For example, information about other people may include stalkers, ex-husbands, abusive spouses, or any other information. Information related to fire that may be useful to firemen who arrive at a residence or work location may include chemicals stored on the property, number of children and adults at the location, number of stories of a residence or building, and any other information that may be helpful to firemen who arrive at the scene. Information related to an ambulance selection may include disease or physical/mental condition of a person at the residence, allergies to medications, or any other information that may be helpful to emergency medical services upon arrival at the location of the cordless telephone. In addition, information associated with relatives or friends of a user may be stored in an emergency message for one or more of the options so that emergency personnel may have other leads or information to identify or receive assistance in tracking a person or providing other information of a person who calls a PSAP in the event of an emergency.

Figure 4B:
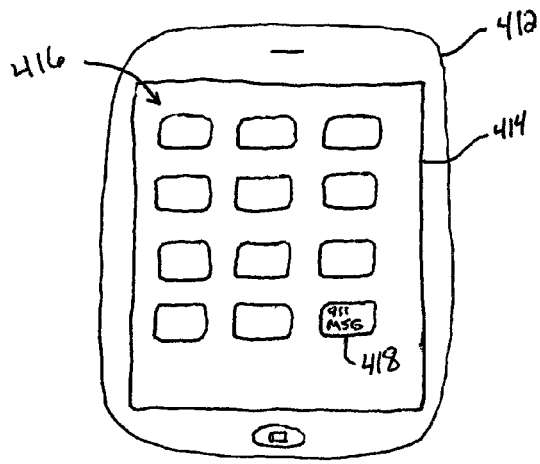
FIG. 4B is an illustration of an illustrative wireless telephone configured with a soft-button for selecting and communicating pre-stored emergency messages to a PSAP during an emergency.

With regard to FIG. 4B, an illustrative wireless telephone 412, such as a mobile telephone, may be configured with an electronic display 414 that shows a graphical user interface 416 with a soft-button 418 that enables a user of the wireless device 412 to place an emergency 911 call and communicate an emergency message to an operator at a PSAP. The soft-button 418 may be responsive to a user holding the soft-button 418 for a certain time period, such as two seconds, or activating the soft-button 418 in a certain sequence (e.g., three times within a second). The soft-button 418 may be configured to access and communicate a pre-stored emergency message to a PSAP or open another graphical user interface that provides multiple, selectable soft-buttons to enable a user to select a topic (e.g., police, fire, ambulance) that is most related to the user's current emergency situation.

Figure 4C:
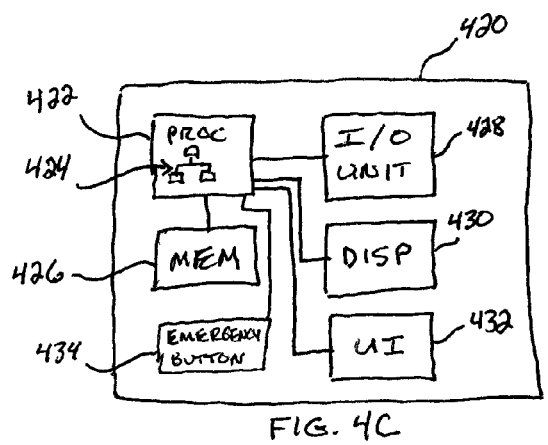
FIG. 4C is a block diagram of an illustrative telephone configured to store pre-stored emergency messages for selection and communication to a PSAP during an emergency.

With regard to FIG. 4C, a block diagram of an illustrative telephone 420, which may be hard-line, cordless, or wireless, is shown. The telephone 420 may include a processing unit 422 that executes software 424. The software 424 may be configured to collect, manage, and communicate pre-stored emergency messages in accordance with the principles of the present invention. The processing unit 422 may be in communication with a memory 426, input/output unit 428, electronic display 430, user interface 432, and emergency button (optional) 434. The memory may be configured to store information, such as pre-stored emergency messages, and software. The I/O unit 428 may be configured to communicate over a communications network using a wired, cordless, or wireless communications protocol, as understood in the art. The electronic display 430 may enable the processing unit 422 to display information that may be selected by a user to select an emergency message for communicating to a PSAP during an emergency. The user interface 432 may be a keypad or other hard or soft-buttons that may be selectably used by a user in operating the telephone 420 in accordance with the principles of the present invention. In one embodiment, the telephone 420 may include an emergency button 434, which is configured to communicate directly with the processing unit 422 to initiate recording and/or communicating an emergency message to the PSAP during an emergency. In an alternative embodiment, the user interface 432 may incorporate the emergency button 434 and be configured to cause the processing unit 422 to operate in the same or similar manner.

Figure 4D:
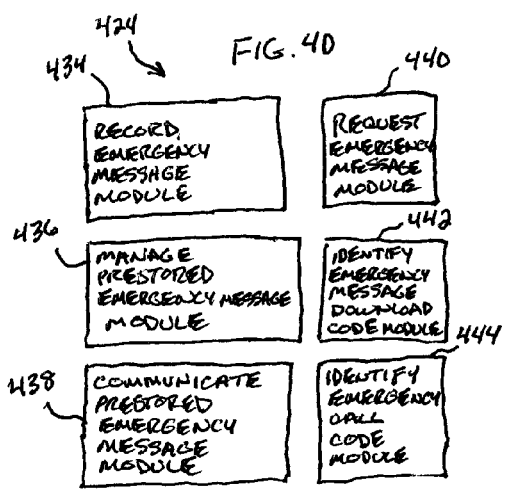
FIG. 4D is a block diagram of illustrative modules configured to be executed by a telephone and enable a user to communicate pre-stored emergency messages to a PSAP during an emergency.

With regard to FIG. 4D, illustrative modules 424 are shown. The modules 424 may be software modules executed by the processing unit 422 of FIG. 4C. Alternatively, the modules 424 may be hardware modules that operate on the telephone 420.

The modules 424 may include a record emergency message module 434 that is configured to enable a user to record an emergency message for storing on the telephone for use in communicating to a PSAP during an emergency situation. The record emergency message module 434 may provide audio or textual prompts to a user to enter text or audio information in the telephone.

A manage pre-stored emergency message module 436 may be configured to maintain pre-stored messages in a memory that may be selectably accessed by a user to communicate one or more of the pre-stored emergency messages during an emergency telephone call to a PSAP. The manage pre-stored emergency message module 436 may be configured to automatically request an update of emergency message information from a user on a periodic or aperiodic basis (e.g., every six months, every year, in response to determining that the telephone is at a different network or geographic location).

A communicate pre-stored emergency message module 438 may be configured to communicate pre-stored emergency messages being managed by the manage pre-stored emergency message module 436 in response to a user selectably requesting a pre-stored emergency message to be communicated to a PSAP during an emergency 911 telephone call. The communicate pre-stored emergency message module 438 may be configured to communicate the pre-stored emergency message in a data or audio format depending on the configuration of the telephone and network.

A request emergency message module 440 may be configured to request an emergency message from a network node, such as a server, located on a communications network, such as a telecommunications network or the Internet. The request emergency message module 440 may be initiated in response to a user selecting a hard-button or soft-button on the telephone to automatically request emergency message information from the network node that the user has previously entered at the network node using text or verbal entry. The request emergency message module 440 may be configured to both request and receive one or more emergency messages from the network node for storage on the telephone.

An identify emergency message download code module 442 may be configured to identify an emergency message download code communicated from a network node to notify the telephone that one or more emergency messages are being downloaded to the telephone for storage thereon. The emergency message download code may be in the form of a dual-tone multiple frequency (DTMF) signal similar to those used on facsimile machines to notify the facsimile machine that data is being communicated for printing. In this case, the emergency message download code notifies the telephone that one or more emergency messages are being downloaded to the telephone for storage. The identify emergency message download code module 442 may communicate with the manage pre-stored emergency message module 436 for assistance in storing and managing the emergency message(s).

An identify emergency call code module 444 may be configured to identify an emergency call code that is generated by a user pressing a hard-button or a soft-button or dialing a particular call number, such as "*911," to place a call to a PSAP and communicate an emergency message to the PSAP during the telephone call. In an alternative embodiment, a determination that a user dialed "911" may be made and a generic pre-stored message may be communicated to a PSAP operator.

Figure 5A:
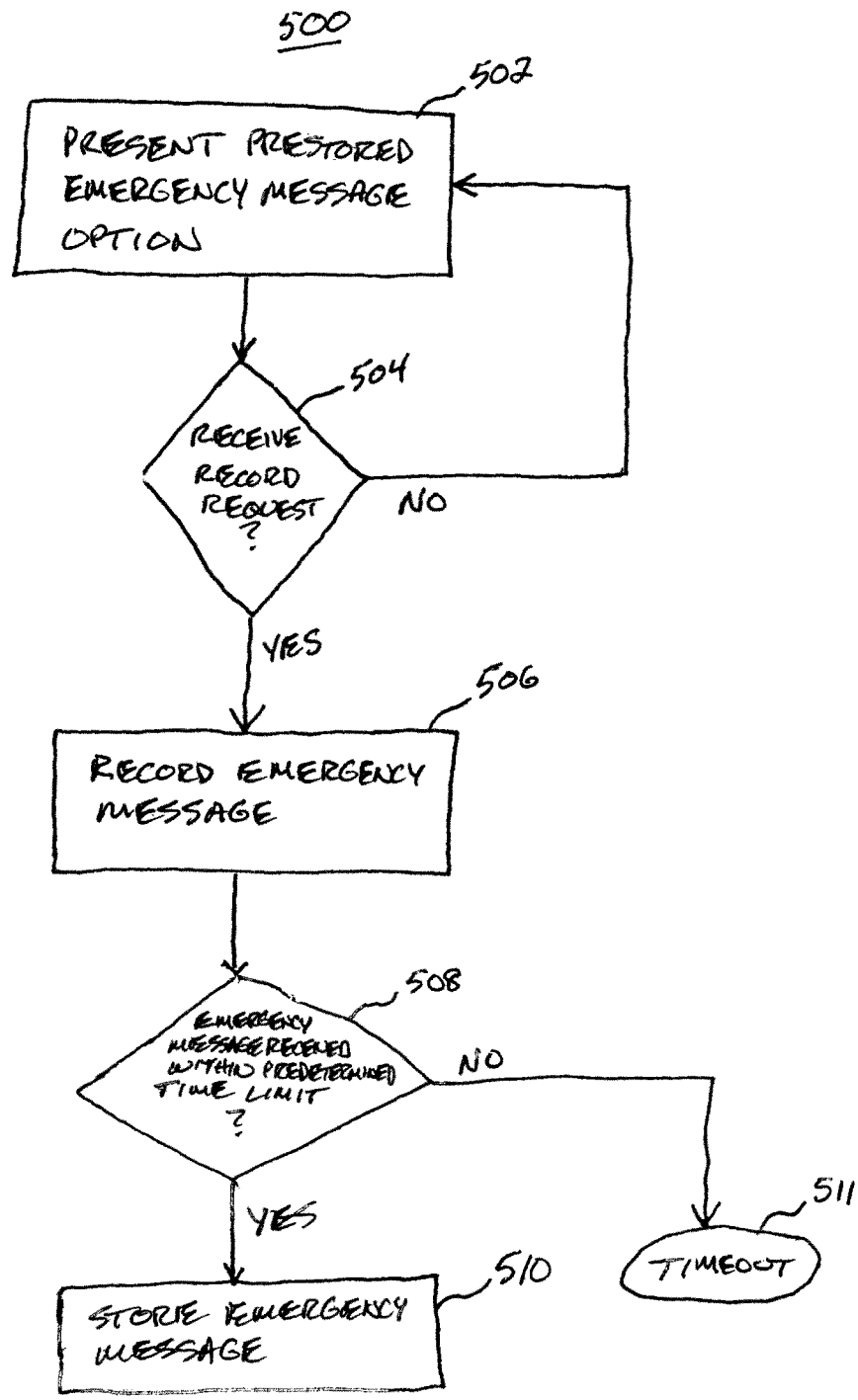
FIG. 5A is a flow diagram of an illustrative process executable on a telephone that enables a user to record an emergency message for communication to a PSAP during an emergency.

With regard to FIG. 5A, an illustrative process 500 that enables a user of a telephone to record an emergency message is provided. The process 500 starts at step 502, where a pre-stored emergency message option is presented to the user. The pre-stored emergency message option may be a hard-button or a soft-button that the user may select to initiate recording. In one embodiment, the pre-stored emergency message option may be selected by holding a hard-button down for five seconds, repeat pressing a hard or soft-button three times within a second, or be a different hard-button or a soft-button than one used to communicate an emergency message during an emergency 911 telephone call. In step 504, a determination is made as to whether a record emergency message request is received. If not, the process returns to step 502. Otherwise, the process continues at step 506, where the user may record an emergency message. In one embodiment, the emergency message is recorded using text or audio prompts that enables the user to speak the emergency message information into the telephone. Alternatively, the emergency message information is recorded by receiving text from the user via a keypad or other user interface (e.g., touch screen). At step 508, a determination may be made at step 508 as to whether an emergency message is received within a predetermined time limit. If so, then the process continues at step 510, where the emergency message may be stored on the telephone or remotely on a network node. Otherwise, the process 500 continues at step 511, where the process times-out and the process 500 exits without storing an emergency message.

Figure 5B:
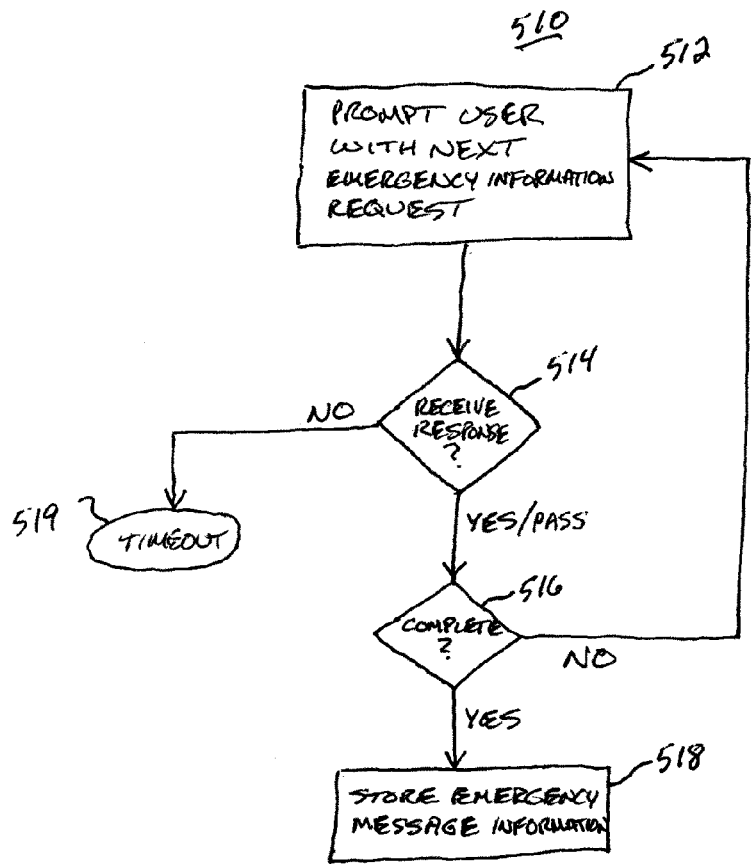
FIG. 5B is a flow diagram of an illustrative process for a telephone to prompt a user to enter emergency information to create a pre-stored emergency message.

With regard to FIG. 5B, an illustrative process 510 is shown to expand on the record emergency message step 506 (FIG. 5A). The process 510 may start at step 512 where a user is prompted with a next emergency information request. The next emergency information request may be prompted using an interactive voice response system or be a text input field on a graphical user interface, such as a webpage. At step 514, a determination is made as to whether a response is received within a certain period of time. If the user responds to the emergency information request by entering information or simply passing on the information (e.g., user entering a pound key or skipping a text entry field), then the process continues at step 516. At step 516, then the process determines whether the emergency information being requested is complete. If not, then the process returns to step 512, where next emergency information is requested. If the emergency information is complete, then the process continues at step 518, where the emergency message information is stored. If at step 514, a response is not received within a certain period of time, then the process 510 may timeout at step 519 without storing the emergency message information. In one embodiment, the emergency message information is stored on a telephone. Alternatively, the emergency message information may be stored on a network node.

Figure 5C:
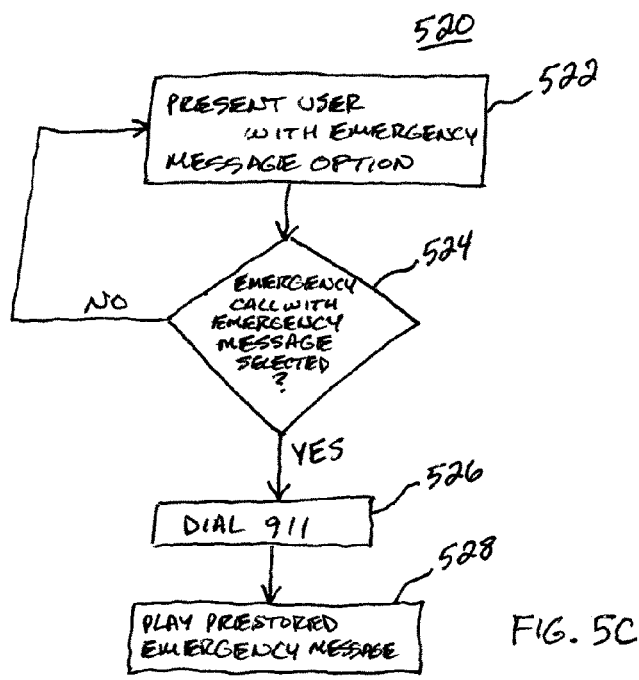
FIG. 5C is a flow diagram of an illustrative process for communicating a pre-stored message to a PSAP during an emergency.

FIG. 5C is a flowchart of an illustrative process 520 for enabling a user using a telephone to communicate a pre-stored emergency message to a PSAP. The process 520 starts at step 522, where a user of a telephone is presented with an emergency message option. The emergency message option may be an option for the user to communicate a pre-stored emergency message to a PSAP. In presenting the user with the emergency message option, the telephone may be configured with a hard-button or soft-button for the user to select to initiate an emergency 911 call and, upon the call being answered by an operator at the PSAP, play the pre-stored emergency message for the operator. At step 524, a determination as to whether an emergency call with an emergency message being selected is made. If not, then the process returns to step 522. Otherwise, the process continues at step 526, where a PSAP is called by the telephone dialing 911. At step 528, the pre-stored emergency message is played to an operator at the PSAP upon answering the emergency call. In one embodiment, after the emergency message is played for the operator, the telephone remains off-hook to enable the user to tell the operator additional information about his or her circumstances. Otherwise, in the event that the caller does not desire or is unable to speak with the emergency operator, then the call may be terminated by the telephone automatically.

Figure 6:
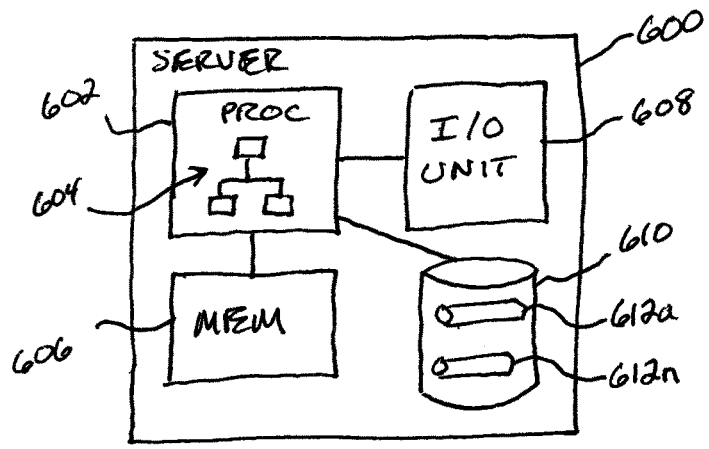
FIG. 6 is a block diagram of an illustrative server configured to provide for collecting and communicating a pre-stored emergency message for storage on a telephone or other network node.

With regard to FIG. 6, an illustrative server 600 is shown. The server 600 may be a network node operating on a telecommunications or other data network, such as the Internet. The server 600 may include a processing unit 602 that executes software 604. The software 604 may be utilized to enable users to create emergency messages for downloading to their telephones or otherwise maintained on a network for use in communicating to a PSAP during an emergency situation. The processing unit 602 may be in communication with a memory 606, I/O unit 608, and storage unit 610. The storage unit 610 may be configured to store one or more data repositories 612a-612n (collectively 612), where the data repositories may store emergency message information to enable users to reaccess the emergency data information to update or otherwise change at a later time in the event that the user changes locations, names, or any other information that the user may wish to update. The data repository 612 may store data, such as text, and/or voice data in the case of a user calling an interactive voice response system operated by the processing unit 602.

Figure 7:
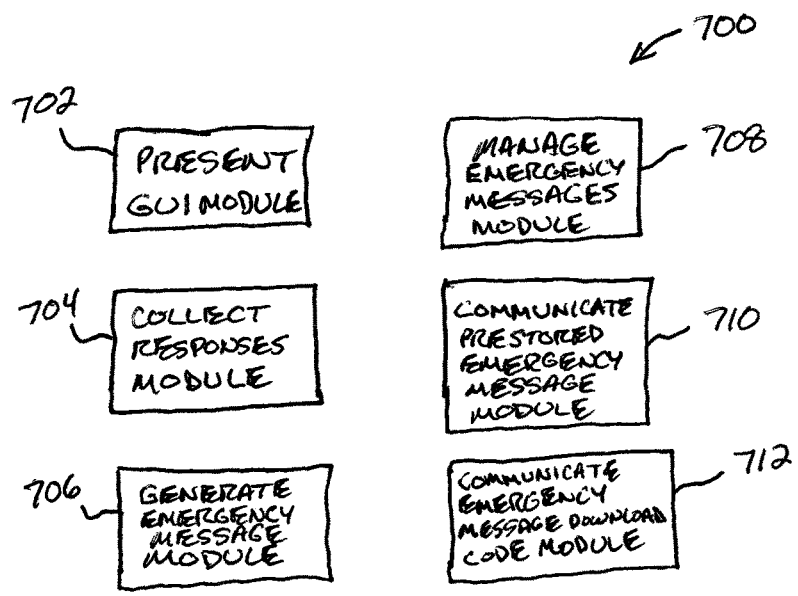
FIG. 7 is a block diagram of illustrative modules configured to be executed on the server of FIG. 6 to provide for collecting and communicating pre-stored emergency messages in accordance with the principles of the present invention.

With regard to FIG. 7, module 700 may be utilized to enable the server to perform collection of emergency data information and communication of the emergency data information to telephones of users. The module 700 may be software modules that operate in conjunction with the software 604 executed by the processor 602 of FIG. 6, firmware modules that execute as embedded modules on chips or other devices and at the server 600, or hardware modules that operate on or conjunction with the server 600.

A present GUI module 702 may be configured to present a user with a graphical user interface, such as a webpage or a website, that enables the user to submit emergency data information for use in delivering emergency messages to an operator of a PSAP. The present GUI module 702 may be graphical and/or text in nature to enable a user to type emergency data information into the GUI. In one embodiment, the present GUI module 702 may be configured to enable a user to be prompted with audio requests using an interactive voice response system, as understood in the art.

A collect responses module 704 may be configured to collect emergency data information entered into data fields of a GUI or voice responses in response to an interactive voice response system's prompts to the user. The collect responses module 704 may be configured to store the responses in a data repository, such as a database.

A generate emergency message module 706 may be configured to generate emergency messages by appending the emergency data information collected into a string of emergency data information. In one embodiment, the generate emergency message module 706 may convert the emergency data information into a synthesized voice by using a text-to-speech module (not shown). Alternatively, the generated emergency message may be communicated to a text-to-speech system located on a network for converting the emergency data information into synthesized speech for storage on a telephone or network node.

A manage emergency messages module 708 may be configured to manage emergency messages uploaded or otherwise input into the server. The manage emergency messages module 708 may enable a user to edit emergency data information that was previously uploaded by a user to change data based on different circumstances, such as moving or changing telephone numbers.

A communicate pre-stored emergency message module 710 may be configured to communicate the emergency messages to a telephone of a user. The module 710 may be configured to communicate the emergency messages in data, voice, or synthesized voice formats over a network for delivery to a telephone or other network node. In one embodiment, the communicate pre-stored emergency message module 710 may be responsive to an emergency call from the user and communicate the pre-stored emergency messages to another network node or PSAP for delivery of a pre-stored emergency message during an emergency telephone call.

A communicate emergency message download code module may be configured to create and communicate an emergency message download code to a telephone of a user configured to recognize the emergency message download code to notify the telephone of the user that a pre-stored emergency message is being downloaded to the telephone so as to appropriately receive and store the pre-stored emergency message for use in placing emergency 911 calls. In one embodiment, the emergency message download code may be a "*911" code that notifies the telephone that the pre-stored emergency message is to follow.

Figure 8:
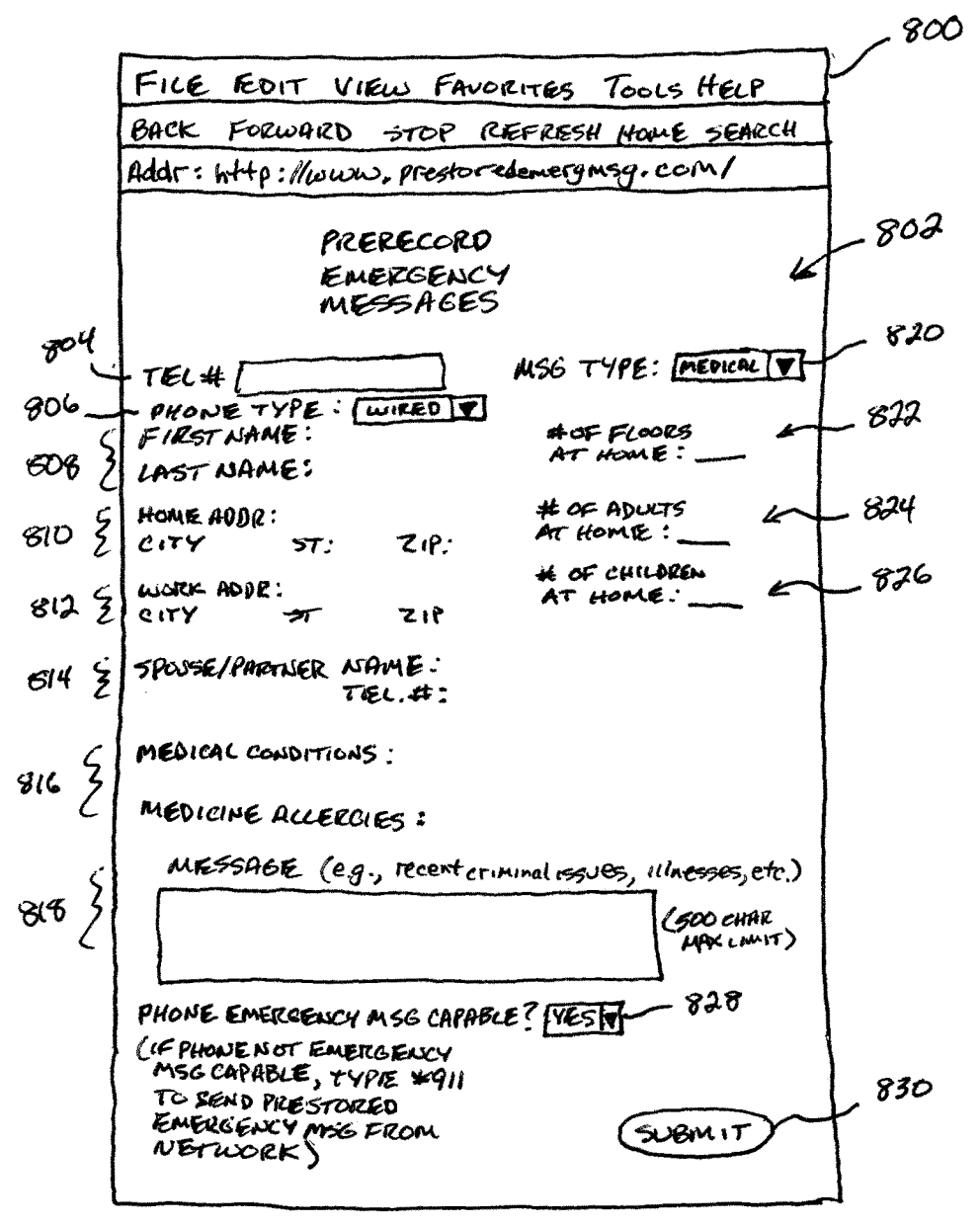

With regard to FIG. 8, a window 800 with an illustrative GUI 802 is shown. The GUI 802 may be a webpage that enables a user to submit emergency data information for use in creating pre-stored emergency messages to store on a telephone. The GUI 802 may include prompts and data fields for the user to enter emergency data information. The emergency data information requested may include telephone number 804, phone type 806, first and last name 808, home address 810, work address 812, spouse/partner information 814, medical conditions and allergies 816, message 818 (e.g., any recent criminal concerns, such as having a stalker or becoming divorced recently, medical conditions, illnesses, etc.), a message type to which the emergency data information is associated 820, number of floors at a home 822, number of adults at the home 824, and number of children at the home 826. In one embodiment, the message may be limited to the number of characters (e.g., 500 characters) or words (e.g., 200 words) that a user may enter, thereby minimizing the message delivery to a PSAP operator. If the number of characters is limited to 160, then a single text message may be communicated to a PSAP operator, if capable of receiving a text message. Otherwise, if longer, multiple text messages or a single email may be communicated to the PSAP operator.

If the message type is medical, then the prompts of emergency information may be different than those if the message type is other than medical, such as police or fire. A prompt 828 for whether the phone is emergency message capable may be provided, where, if the telephone of the user is emergency message capable, then the emergency message may be communicated to the telephone number submitted by the user. Otherwise, if the user's telephone is not emergency message capable, then the emergency message may be located on a network node and the network node may be configured to identify that an emergency call is being placed from the telephone number of the user and, in response, communicate the pre-stored emergency message to a PSAP in an audio format either directly or via a text-to-speech system located at the PSAP or on the network. Once the emergency data message is entered into the GUI 802, the user may select a "submit" soft button 830 to submit the emergency data information.

Figure 9:
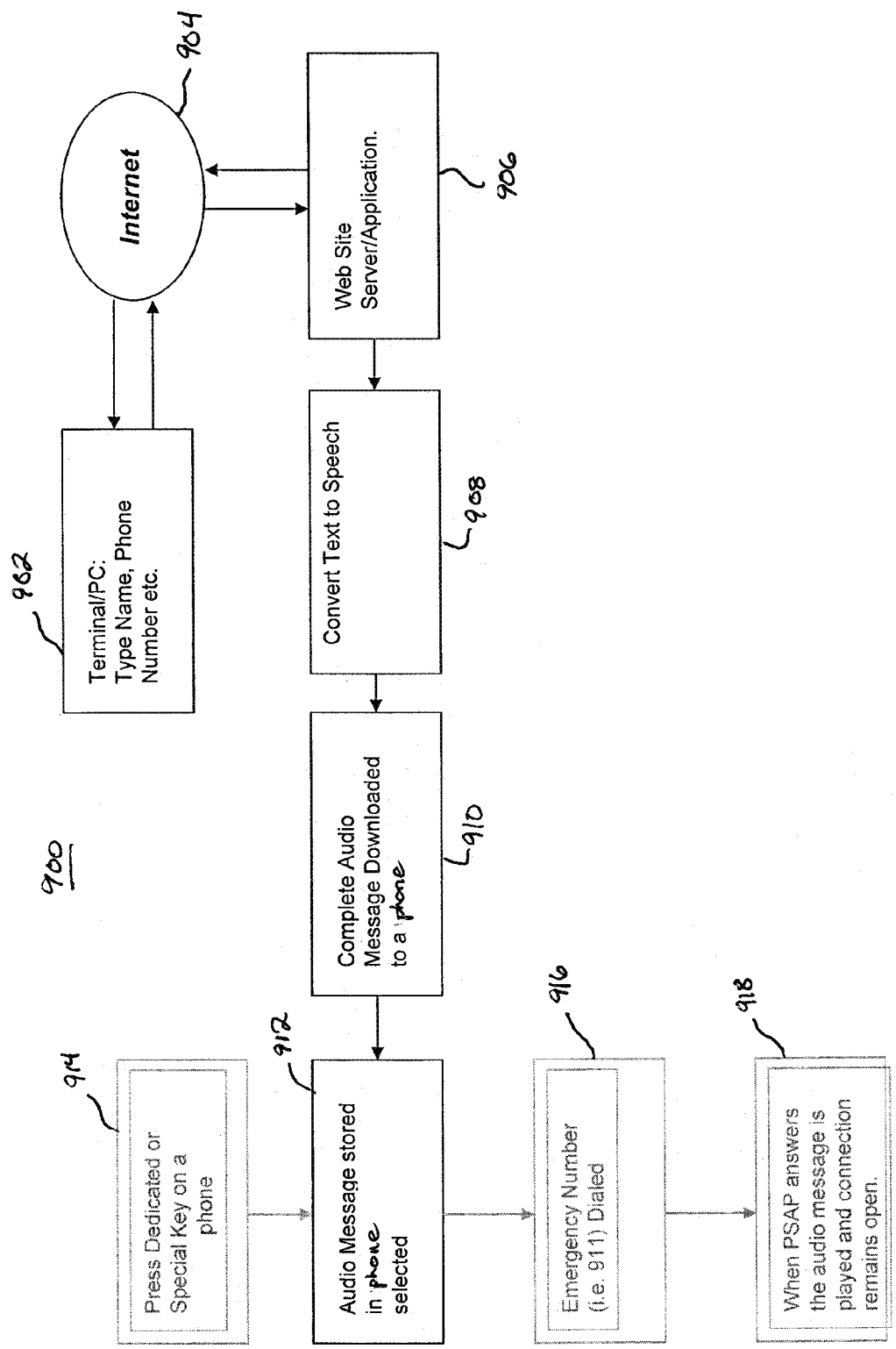
FIG. 9 is an illustration of an illustrative system and process for establishing a pre-stored emergency message for communicating to a PSAP during an emergency.

With regard to FIG. 9, an illustrative process diagram showing both system and process steps 900 are provided. The system may include a computer 902 utilized by a user to access a network 904, such as the Internet. A website server application 906 may be provided to the user via the Internet 904 to enable the user to submit emergency data information to the website server application 906. The website server application 906 may communicate emergency data information collected from the user to a text-to-speech system or application 908 that converts the text entered by the user via the computer 902 into speech. At step 910, the emergency message may be downloaded to a phone configured to store pre-stored emergency messages. At step 912, the audio emergency message is stored in the phone that was selected by the user. After the user has downloaded the audio message to the phone, at step 914, the user may press a dedicated or special key on the telephone to cause an emergency telephone number (e.g., 911) to be dialed at step 916. When an operator at a PSAP answers the emergency call, the pre-stored emergency message in an audio format may be played and the connection may remain opened so that the operator may hear what is happening or the user may tell the operator additional information associated with the emergency at step 918.

Figure 10:
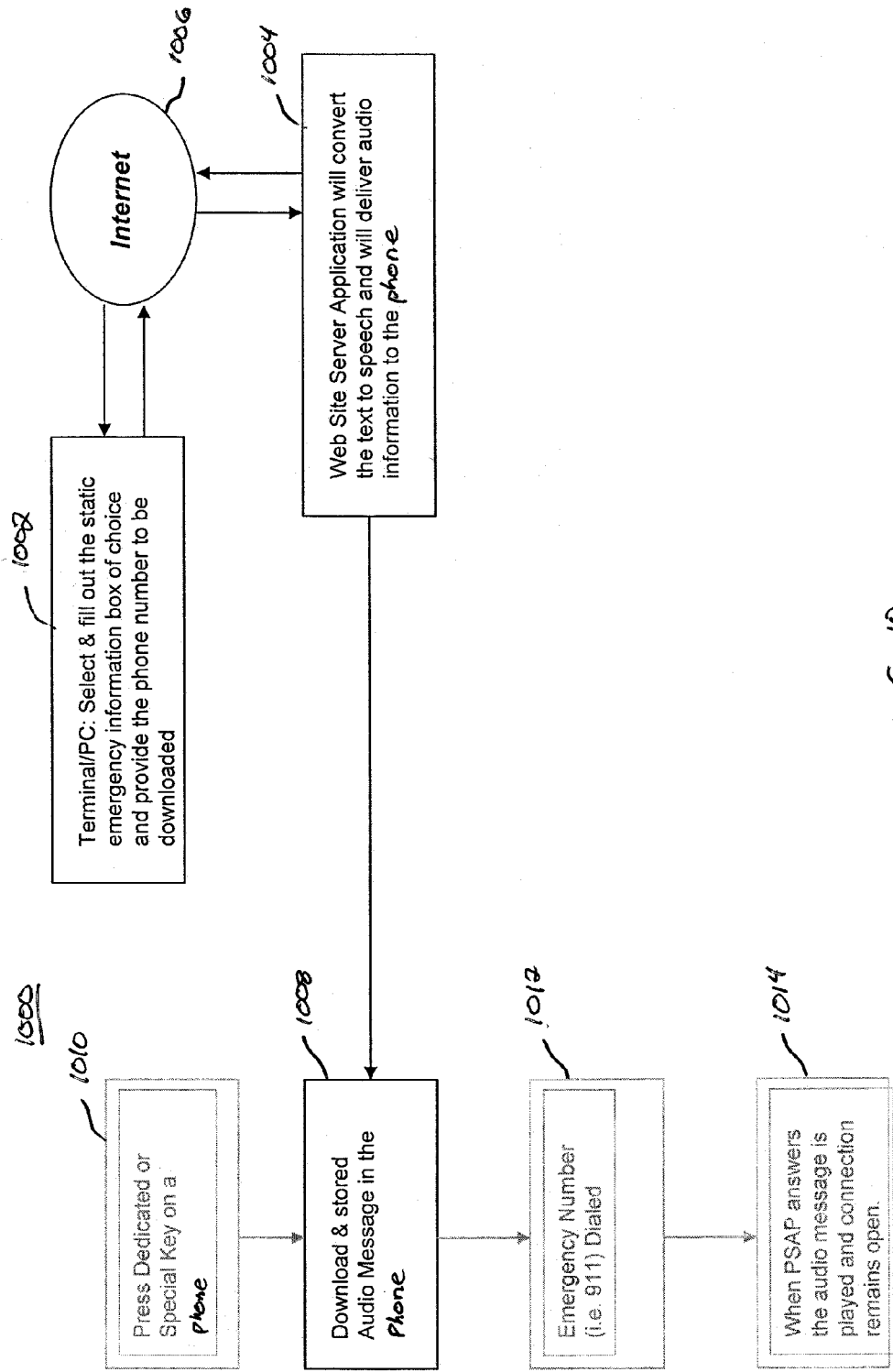
FIG. 10 is a block diagram of an illustrative system and process for establishing a pre-stored emergency message on a wireline telephone for use in communicating to a PSAP during an emergency.

With regard to FIG. 10, an illustrative system and process 1000 is shown to enable a user to upload emergency data information for storage on his or her telephone or other network node. The user may utilize a computer 1002 that enables a user to interact with a website server 1004 via a network, such as the Internet 1006, to upload and submit emergency data information to a website operating on a server on the network 1006. The website server 1004 may also be configured with a text-to-speech system to convert text entered by the user into speech for delivery to a telephone 1008 for download and storage thereon. After the pre-stored emergency message is downloaded and stored on the telephone 1008, the user may press a dedicated or special key on the phone at step 10101 to cause the phone to call emergency service and communicate the pre-stored emergency message to an operator. The emergency service may be called at step 1012, and the pre-stored emergency message may be communicated to an operator when he or she answers the emergency call at step 1014.

Figure 11:
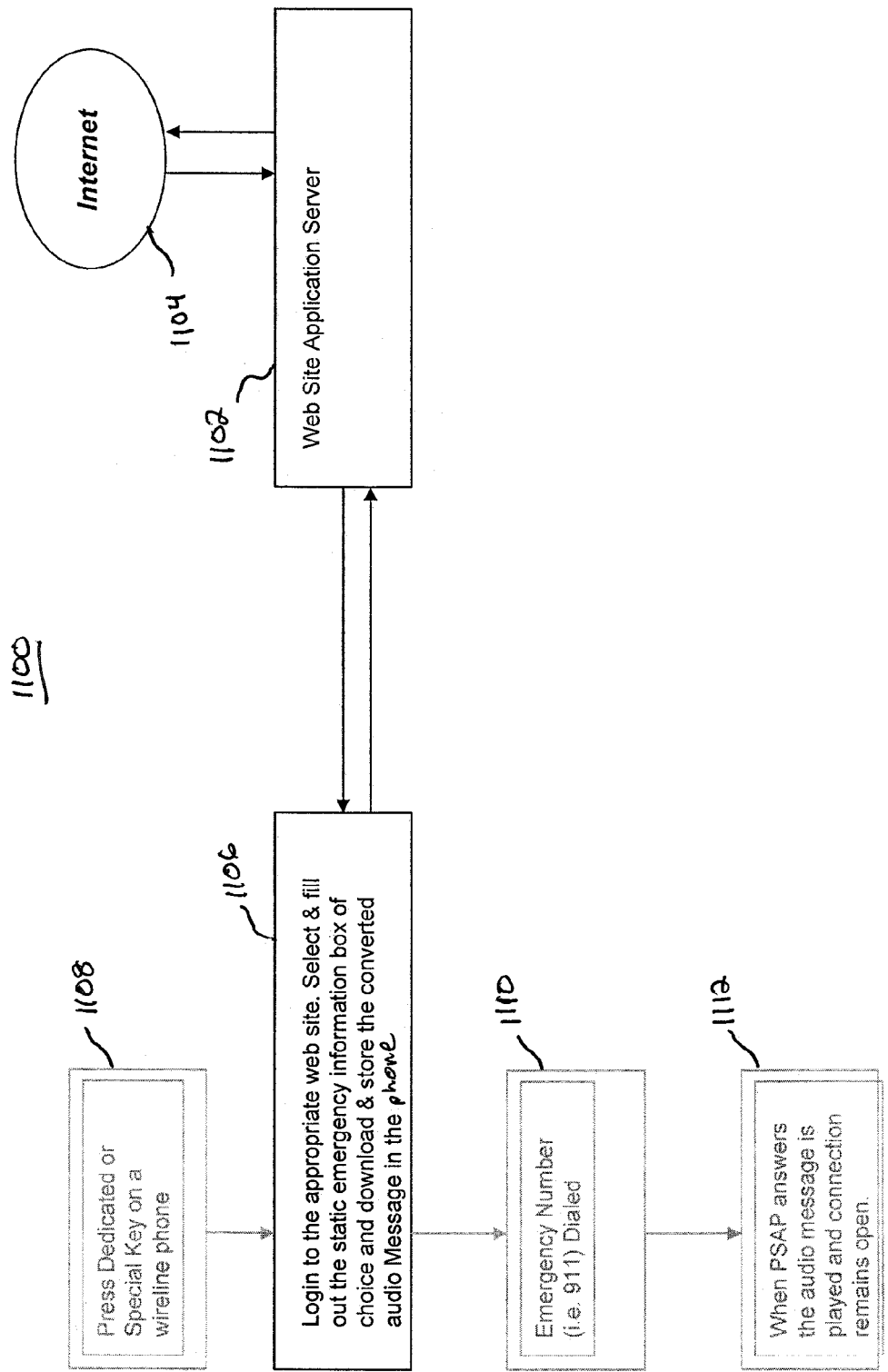
FIG. 11 is a block diagram of a system and process for establishing an emergency message utilizing a voice over internet protocol (VoIP) telephone.

With regard to FIG. 11, a telephone having internet capabilities, such as a voiceover internet protocol (VoIP)

telephone, may be utilized to access a website application server 1102 operating on a network 1104, such as the Internet. The user may log onto the website application server 1102 at step 1106 and enter emergency data information presented to the user via the website application server 1102. It should be understood that any phone having internet capabilities may be configured to access the website application server 1102 to enter emergency data information for downloading to the phone. Steps 1108, 1110, and 1112 operate in the same or similar manner as steps 914, 916, and 918 described in FIG. 9.

Figure 12:
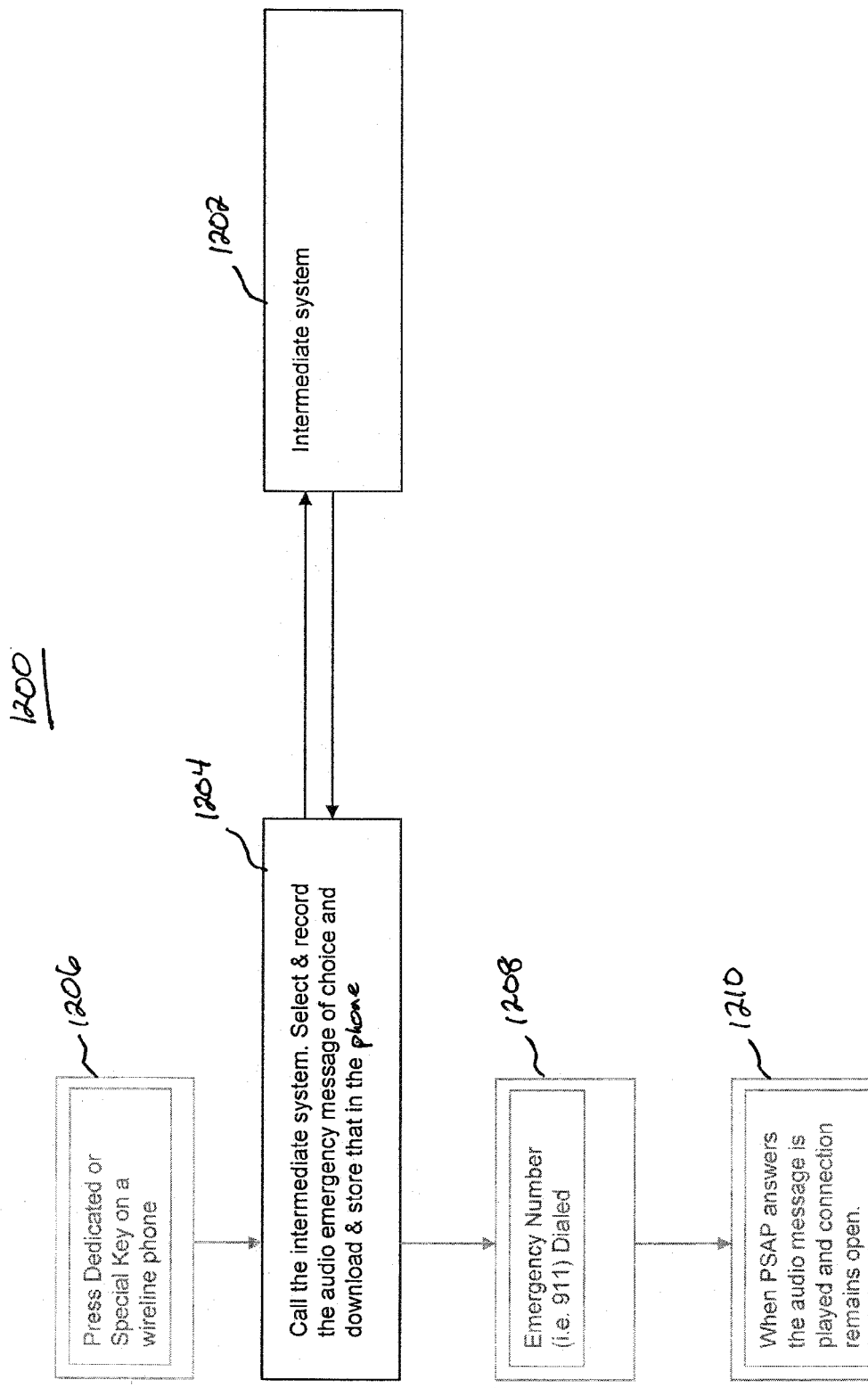
FIG. 12 is a block diagram of an illustrative system and process for accessing and utilizing a pre-stored emergency message during an emergency telephone call to a PSAP.

With regard to FIG. 12, an illustrative system and process 1200 is shown to include an intermediate system 1202 that is accessible to a user having a telephone configured to store emergency messages for use when calling emergency 911 operators at PSAPs. At step 1204, a user may call the intermediate system 1202 that is operating on a telecommunications network or data network. The intermediate system 1202 may be configured to store certain preset emergency messages (e.g., "Fire, send help") provided by a service provider. The user may call the intermediate system 1202 and select an emergency message and download the emergency message in the telephone. Steps 1206, 1208, and 1210 may operate in the same or similar manner as steps 914, 916, and 918 in FIG. 9.

With regard to FIG. 13, an illustrative process 1300 is shown performing pre-stored emergency data communications in accordance with the principles of the present invention. The process 1300 starts at step 1302, where a hard-key or soft-key or button on a telephone or handset is pressed or otherwise activated by a user. At step 1304, a determination is made as to whether the phone or handset is configured with a multiple message option. If so, then the process continues at step 1306, where an audio message may be requested from among multiple audio messages for use in communicating to a PSAP during the emergency call. In one embodiment, the phone may provide the user with the ability to select one of multiple messages, such as police, fire, or ambulance. The emergency messages may be selectable via a hard-button or soft-button provided on the phone for the user to select a particular type of message. At step 1308, the user may dial an emergency number, such as "911". In an alternative embodiment, the user may enter an emergency code, such as "*911", thereby causing the phone to access the pre-stored emergency message and call a PSAP. At step 1310, an audio message of the pre-stored emergency message is played to an operator at the PSAP. If a determination is made at step 1304 that the telephone does not have multiple message options, then the process continues at step 1308, where the emergency number is dialed and the emergency message is communicated at step 1310 to an operator at the PSAP.

With regard to FIG. 14, an illustrative process 1400 is provided. The process 1400 starts at step 1402, where an emergency data message is received from a user. In one embodiment, the emergency data message may be received from the user on a telephone, such as a wireline, cordless, or mobile telephone, or a network node, such as a server operating on a telecommunications or data network. At step 1404, an emergency data message may be communicated in an audio format to a PSAP in response to receiving an emergency call request. The emergency call request may be in response to a user pressing a hard-button or a soft-button that initiate a call to a PSAP and communication of the pre-stored emergency message to an operator at the PSAP in response to the operator answering the emergency call.

By utilizing the principles of the present invention, a caller, such as a child, deaf person, person m an emergency situation, without the ability or desire to speak may be made safer through the use of communicating a pre-stored emergency message to a PSAP operator. The PSAP operator may be able to collect sufficient information from the pre-stored emergency message so as to better provide information to emergency responders even without speaking with the caller.

The previous detailed description is of a small number of embodiments for implementing the invention and is not intended to be limiting in scope. One of skill in this art will immediately envisage the methods and variations used to implement this invention in other areas than those described in detail. The following claims set forth a number of the embodiments of the invention disclosed with greater particularity.

What is claimed:

1. A system for assisting with calls to public safety answering points (PSAPs), said system comprising:
    a network node configured to enable a user to submit emergency message data;
    a telecommunications device, including:
        a memory;
        a transceiver configured to communicate over a telecommunications network; and
        a processing unit in communication with said memory and transceiver, and configured to:
            in response to receiving the emergency message data in an audio format via the telecommunications network, store the audio emergency message in said memory;
            in response to a determination that the telecommunications device is at one or more of a different network or a different geographic location, request, on a periodic basis, an update of the emergency message data from the user;
            communicate the stored audio emergency message to a PSAP on a full-duplex, two-way voice communication channel in response to the user requesting that the audio emergency message be communicated to the PSAP; and
            maintain said telecommunications device in an off-hook state on the same full-duplex, two-way voice communication channel used to communicate the stored audio emergency message such that an audio connection remains open, in real-time between the user and the PSAP, after communicating the audio emergency message to the PSAP.

2. The system according to claim 1, wherein said network node is configured to present a graphical user interface via a communications network to enable the user to enter the emergency message data.

3. The system according to claim 1, wherein said telecommunications device is maintained in the off-hook state for a period of time.

4. The system according to claim 1, wherein said processing unit is further configured to:
    identify an emergency message download code; and
    in response to identifying the emergency download code, download the audio emergency message.

5. The system according to claim 1, wherein said telecommunications device further includes a hard-button configured, in response to being selected by the user, to notify said processing unit to initiate communication to the PSAP and communicate the audio emergency message thereto.

6. The system according to claim 1, wherein said telecommunications device includes multiple, selectable soft-buttons each configured to enable the user to select a different audio message to communicate to the PSAP.

7. The system according to claim 1, wherein said network node is further configured to store the message data and, in response to receiving a request from said telecommunications device, communicate the message data in an audio format to the PSAP.

8. The system according to claim 1, wherein said processing unit is further configured to identify an emergency call code entered by the user and, in response, communicate the audio emergency message to the PSAP.

9. A method for assisting with calls to public safety answering points (PSAPs), said system comprising:
   receiving emergency message data from a user;
   storing the emergency message data in a telecommunications device;
   in response to a determination that the telecommunications device is at one or more of a different network or a different geographic location, requesting, on a periodic basis, an update of the emergency message data from the user;
   in response to receiving an emergency call request from the user at a telecommunications device, communicating the emergency message data in an audio format to a PSAP on a full-duplex, two-way voice communication channel; and
   maintaining an off-hook state on the same full-duplex, two-way voice communication channel used to communicate the stored audio emergency message such that an audio connection remains open, in real-time between the user and the PSAP, after communicating the audio emergency message to the PSAP.

10. The method according to claim 9, further comprising converting the emergency message data into audio message data to produce the audio emergency message.

11. The method according to claim 10, further comprising communicating the audio emergency message to the telecommunications device for storage thereat.

12. The method according to claim 11, further comprising communicating an emergency message download code with the audio emergency message to cause the telecommunications device to store the audio emergency message.

13. The method according to claim 9, further comprising presenting a graphical user interface to the user to enter the emergency message data.

14. The method according to claim 9, further comprising, in response to receiving an emergency call code entered by the user, communicating the audio emergency message to the PSAP.

15. The method according to claim 9, further comprising:
   presenting the user of the telecommunications device with a plurality of options to select different audio emergency messages; and
   in response to the user selecting one of the options, communicating an associated audio message.

16. A method for assisting with calls to public safety answering points (PSAPs), said method comprising:
   providing a user interface to a user of a telecommunications device to enable the user to selectably enter emergency information;
   storing the emergency information entered by the user;
   in response to a determination that the telecommunications device is at one or more of a different network or a different geographic location, requesting, on a periodic basis, an update of the emergency information from the user;
   in response to the user calling a PSAP via the telecommunications device, communicating the stored emergency information in an audio format to the PSAP on a full-duplex, two-way voice communication channel; and
   maintaining an off-hook state on the same full-duplex, two-way voice communication channel used to communicate the stored emergency information in audio format such that an audio connection remains open, in real-time between the user and the PSAP, after communicating the stored emergency information in audio format to the PSAP.

17. The method according to claim 16, wherein the user interface is an interactive voice response system configured to collect audio voice signals from the user.

* * * * *